US010011253B2

United States Patent
Knoke et al.

(10) Patent No.: US 10,011,253 B2
(45) Date of Patent: Jul. 3, 2018

(54) VALVE UNIT FOR MODULATING PRESSURE IN AN AIR-BRAKE SYSTEM

(71) Applicant: WABCO GmbH, Hannover (DE)

(72) Inventors: Stefan Knoke, Hannover (DE);
Karsten Runge, Springe (DE);
Andreas Teichmann, Isernhagen (DE);
Ingo Torhoff, Barsinghausen (DE)

(73) Assignee: WABCO GmbH, Hannover (DE)

( * ) Notice: Subject to any disclaimer, the term of this patent is extended or adjusted under 35 U.S.C. 154(b) by 0 days.

(21) Appl. No.: 15/329,754

(22) PCT Filed: Aug. 6, 2015

(86) PCT No.: PCT/EP2015/001628
§ 371 (c)(1),
(2) Date: Jan. 27, 2017

(87) PCT Pub. No.: WO2016/029994
PCT Pub. Date: Mar. 3, 2016

(65) Prior Publication Data
US 2017/0217412 A1    Aug. 3, 2017

(30) Foreign Application Priority Data

Aug. 27, 2014    (DE) .................. 10 2014 012 712

(51) Int. Cl.
*B60T 8/34*    (2006.01)
*B60T 8/36*    (2006.01)
(Continued)

(52) U.S. Cl.
CPC ............ *B60T 8/3675* (2013.01); *B60T 8/362* (2013.01); *B60T 8/3605* (2013.01); *B60T 13/26* (2013.01); *B60T 15/027* (2013.01)

(58) Field of Classification Search
CPC .......... B60T 8/36; B60T 8/362; B60T 8/3605; B60T 15/027; B60T 15/025; F15B 13/0435; F15B 13/043
See application file for complete search history.

(56) References Cited

U.S. PATENT DOCUMENTS 3,907,379 A  *  9/1975  Lawson ................ B60T 8/3605
                                                                       137/627.5
3,976,335 A  *  8/1976  Sekiguchi .............. B60T 8/362
                                                                       303/118.1
(Continued)

FOREIGN PATENT DOCUMENTS

DE    2224274 A1    11/1973
DE    3408123 A1     9/1985
(Continued)

OTHER PUBLICATIONS

European Patent Office, Rijswijk, Netherlands, English Translation of International Search Report of International Application No. PCT/EP2015/001628, dated Oct. 13, 2015, 3 pages.

*Primary Examiner* — Nicholas J Lane
(74) *Attorney, Agent, or Firm* — Brinks Gilson & Lione

(57) ABSTRACT

A valve unit (1.1, 1.2, 1.3) for modulating pressure in a compressed air braking system has an inlet valve (6) configured as a diaphragm valve, an outlet valve (7) configured as a diaphragm valve, and respective precontrol valves (8, 9), which are each configured as a 3/2-way solenoid valve and are arranged in an elongate valve housing (2), which is divided by a division plane (10) that is largely horizontal in the installation position into a base housing (11) and a housing cover (12). The precontrol valves (8, 9) are arranged in the housing cover (12) in the longitudinal direction (13), and the housing cover (12) has a centrally arranged magnet module (20) and two air guide modules (23, 24) adjacent to the magnet module (20) in the longitudinal direction (13)

(Continued)

and connected via a single connecting element (45) both to each other and to the base housing (11).

15 Claims, 13 Drawing Sheets

(51) Int. Cl.
*B60T 13/26* (2006.01)
*B60T 15/02* (2006.01)

(56) References Cited

U.S. PATENT DOCUMENTS

| | | | |
|---|---|---|---|
| 3,977,734 A * | 8/1976 | Ronnhult | B60T 8/3605 137/627.5 |
| 4,626,045 A | 12/1986 | Takei et al. | |
| 5,022,717 A | 6/1991 | Heibel et al. | |
| 5,454,399 A | 10/1995 | Kazakis et al. | |
| 6,209,971 B1 * | 4/2001 | Ho | B60T 8/343 303/119.2 |
| 6,415,818 B2 * | 7/2002 | Dickman | F16K 31/402 137/596.16 |
| 6,453,936 B1 | 9/2002 | Frank et al. | |
| 8,539,979 B2 | 9/2013 | Frank et al. | |
| 8,672,421 B2 * | 3/2014 | Eidenschink | B60T 8/3605 303/119.1 |
| 2017/0067571 A1 * | 3/2017 | Burger | B60T 15/027 |
| 2017/0253223 A1 * | 9/2017 | Klik | B60T 8/342 |
| 2017/0253224 A1 * | 9/2017 | Dreyer | B60T 8/342 |

FOREIGN PATENT DOCUMENTS

| | | |
|---|---|---|
| DE | 3821044 A1 | 6/1989 |
| DE | 3825549 A1 | 2/1990 |
| DE | 3940232 A1 | 6/1991 |
| DE | 4005608 A1 | 9/1991 |
| DE | 4008095 A1 | 9/1991 |
| EP | 0 439 303 A1 | 7/1991 |
| EP | 0 498 584 A1 | 8/1992 |
| GB | 1 583 341 | 1/1981 |

\* cited by examiner

US 10,011,253 B2

VALVE UNIT FOR MODULATING PRESSURE IN AN AIR-BRAKE SYSTEM

TECHNICAL FIELD

The invention concerns a valve unit for modulating pressure in a compressed air braking system, with a brake pressure input, a brake pressure output and a purge output, and with an inlet valve configured as a diaphragm valve, an outlet valve configured as a diaphragm valve and with, for each diaphragm valve, respective precontrol valves which are each configured as a 3/2-way solenoid valve and are arranged in an elongate valve housing, which is divided by a division plane that is largely horizontal in the installation position into a base housing and a housing cover, wherein the brake pressure input and the brake pressure output are arranged horizontally oriented, largely axially opposite in the longitudinal direction and the purge output is arranged in-between, oriented vertically downward in the base housing, the diaphragm valves are arranged behind each other in the longitudinal direction in the base housing between the brake pressure input and the brake pressure output, with parallel actuation axes and with diaphragms arranged in a common diaphragm plane, largely corresponding to the division plane, and clamped between the base housing and the housing cover, and the precontrol valves are arranged in the housing cover.

BACKGROUND

In lock-protected compressed air braking systems, i.e. anti-lock braking systems, of wheeled vehicles such as motor vehicles and rail vehicles, a valve unit for pressure modulation is provided in each brake line leading from a brake valve to the wheel brake cylinders. This valve unit has an inlet valve and an outlet valve. By means of the inlet valve, a brake pressure output connected to a portion of a brake line which leads to at least one wheel brake cylinder, may be alternately connected to or shut off from a brake pressure input connected to a portion of the brake line which comes from the brake valve. The brake pressure output may be alternately connected to or shut off from a purge output using the outlet valve, wherein the purge output usually leads via a check valve and/or a screen into the ambient air.

Because of large volume flows to be switched, and correspondingly large flow cross-sections to be opened and closed, the inlet valve and the outlet valve are normally configured as pneumatically actuatable diaphragm valves which can be activated via a respective precontrol valve configured as 3/2-way solenoid valve. A diaphragm valve has a largely circular, disc-like flexible membrane which is clamped at its edge in a valve housing. A central, round valve seat of a cylindrical inner flow channel, with an annular outer flow channel arranged concentrically thereto, is arranged on the axial inside of the diaphragm on which the flow channels are arranged which are connected to the compressed air input and compressed air outputs. On the axially opposite outside of the diaphragm, a control chamber is arranged which can be loaded by the assigned precontrol valve alternately with a high control pressure, usually taken from the brake pressure input, or with a low control pressure (ambient pressure), usually taken from the purge output. When the control chamber is loaded with the high control pressure, the diaphragm is pressed against the valve seat, whereby the inner flow channel is isolated from the outer flow channel, which corresponds to the closed state of the diaphragm valve concerned. When the control chamber is loaded with the low control pressure, the diaphragm which due to its shape normally lies automatically on the valve seat, is lifted away from the valve seat by the brake pressure predominating in the flow channels and moved in the direction of the control chamber, whereby the inner flow channel is connected to the outer flow channel, which corresponds to the open state of the diaphragm valve concerned.

Such a valve unit has the switch functions "build up pressure", "maintain pressure", and "reduce pressure". In the "build up pressure" switch function of the valve unit, the inlet valve is opened and the outlet valve is closed, so that the brake pressure introduced via the brake valve at the brake pressure input is conducted unchanged to the brake pressure output and to at least one wheel brake cylinder connected thereto. Since the "build up pressure" switch function corresponds to the rest state of the valve unit, the precontrol valve of the inlet valve, when its magnetic coil is not powered, connects the control chamber of the inlet valve to a control line carrying the low control pressure. Similarly, the precontrol valve of the outlet valve, when its magnetic coil is not powered, connects the control chamber of the outlet valve to a control line carrying the high control pressure.

In the "maintain pressure" switch function of the valve unit, the inlet valve and the outlet valve are closed so that the brake pressure, present at the brake pressure output and at the at least one wheel brake cylinder connected thereto, is held constant. To set this switch function, only the precontrol valve of the inlet valve is switched by powering its magnetic coil, and hence the control chamber of the inlet valve is loaded with the high control pressure.

In the "reduce pressure" switch function of the valve unit, the inlet valve is closed and the outlet valve opened so that the brake pressure output and the at least one wheel brake cylinder connected thereto are purged. To set this switch function, both precontrol valves are switched by powering their magnetic coils, and hence the control chamber of the inlet valve is loaded with the high control pressure and the control chamber of the outlet valve is loaded with the low control pressure.

The "maintain pressure" and "reduce pressure" switch functions of the valve unit are antilock functions with which a braking-induced locking of the at least one assigned wheel is avoided. These switch functions are controlled by a corresponding actuation of the precontrol valves by a control unit of the anti-lock system, in which the signals from the wheel speed sensors are analyzed to detect an impending or existing locking of the braked wheels.

With regard to the geometric arrangement of the compressed air inputs and compressed air outputs, the inlet valves and outlet valves configured as diaphragm valves, and the precontrol valves configured as solenoid valves, in a valve housing, various embodiments of such valve units are known.

Thus for example publications DE 22 24 274 C3, DE 34 08 123 A1, DE 38 25 549 A1, DE 40 05 608 A1 and DE 40 08 095 A1 describe various embodiments of valve units in which the diaphragm planes of the inlet valve and outlet valve are oriented perpendicular or parallel to each other. The precontrol valves configured as 3/2-way valves in these valve units are arranged either with different orientation of the actuation axes close to the assigned diaphragm valve, or parallel and radially adjacent to each other in different regions of the respective valve housing.

Because of the arrangement of the compressed air inputs and compressed air outputs, the inlet valves and the outlet valves, and the precontrol valves, in the above-mentioned valve units a multipiece design and complex machining of the respective valve housing are required. In particular, the respective arrangement of the diaphragms of the inlet valve and outlet valve in different diaphragm planes requires multiple re-clamping of the housing parts for machining of the valve seats and the channel edges or chamber edges between which the diaphragms are clamped. To reduce the production complexity, therefore, valve units have already been proposed in which the diaphragm valves are arranged with parallel actuation axes and diaphragms arranged in a common diaphragm plane, largely corresponding to a division plane between two housing parts.

Such a valve unit is described for example in DE 25 17 571 A1. In this known valve unit, an elongate valve housing is divided by a division plane that is horizontal in the installation position into a housing lower part and a housing upper part. The brake pressure input and the purge output are positioned largely axially opposite in the longitudinal direction with horizontal orientation, and the brake pressure output, also with horizontal orientation, is arranged largely centrally at right angles thereto in the housing lower part. The diaphragm valves are arranged in the housing lower part between the brake pressure input and the purge output, with parallel actuation axes and diaphragms arranged in a common diaphragm plane, largely corresponding to the division plane, being clamped between the housing lower part and the housing upper part, behind each other in the longitudinal direction of the valve housing. The precontrol valve of the inlet valve and the precontrol valve of the outlet valve are each arranged with vertical orientation of their actuation axes and with the same switching directions above the respective assigned diaphragm valve, radially adjacent to each other in the housing upper part, whereby the installation height of the housing upper part and hence the entire valve unit is relatively large.

In a further such valve unit known from EP 0 498 584 B1, the valve housing is divided by a division plane which is vertical in the installation position into an input housing and an output housing. The brake pressure input is arranged with horizontal orientation at the top in the input housing. The brake pressure output is arranged, with horizontal orientation, largely axially opposite the brake pressure input in the output housing, whereas the purge output is arranged oriented vertically downward in the output housing. The diaphragm valves are arranged above each other in the output housing between the brake pressure output and the purge output, with parallel actuation axes and diaphragms arranged in a common diaphragm plane, largely corresponding to the division plane, being clamped between the output housing and the input housing. The precontrol valve of the inlet valve and the precontrol valve of the outlet valve are each arranged with horizontal orientation of their actuation axes and opposite switching directions, approximately at right angles to the compressed air inputs and compressed air outputs and parallel to the division plane, radially adjacent to each other in the input housing. The magnetic coils of the precontrol valves are arranged in a magnet block which, together with the mechanical components of the solenoid valve used, is arranged between a housing upper part and a housing lower part of the input housing. For sealing, seals or sealing rings are arranged between firstly the magnet block, valve blocks and valve seats of the solenoid valves, and secondly the housing upper part and housing lower part of the input housing. To fix the housing upper part and housing lower part to the magnet block of the solenoid valves, and also to clamp the diaphragms of the diaphragm valves, the housing upper part and the housing lower part of the input housing are each bolted to the output housing. This known valve unit thus consists of many components which are relatively difficult to fit. Production and assembly of this known valve unit are therefore relative complex and costly.

Finally, DE 10 2008 028 439 B3 describes a valve unit in which an elongate valve housing is divided by division planes that are largely horizontal in the installation position, into a housing lower part, a housing upper part and an intermediate plate arranged in-between. The brake pressure input, the brake pressure output and the purge output are each arranged with horizontal orientation in the housing lower part. The diaphragm valves are arranged in the housing lower part with parallel actuation axes and diaphragms arranged in a common diaphragm plane, largely corresponding to the division plane between the housing lower part and the intermediate plate, being clamped between the housing lower part and the longitudinal intermediate plate, behind each other in the longitudinal direction. The precontrol valve of the inlet valve and the precontrol valve of the outlet valve are each arranged with vertical orientation of their actuation axes and with the same switching directions above the respective assigned diaphragm valve, radially adjacent to each other in the housing upper part, whereby the installation height of the housing upper part and hence the entire valve unit is relatively large. The intermediate plate is bolted to the housing lower part. The housing upper part is bolted via an outer cover to the intermediate plate or the housing lower part. Seals are arranged in the division plane between the housing upper part and intermediate plate. This valve unit too consists of many components, which are however relatively simple to install from above. Nonetheless, the production and assembly of this known valve unit are also relatively costly.

SUMMARY OF THE INVENTION

The present invention is therefore based on the object of proposing a valve unit of the type described above for modulating pressure in a compressed air braking system, which has compact dimensions, is easy to install and has good control properties, in particular short switching times of the diaphragm valves.

The object of the invention is achieved in that the precontrol valve of the inlet valve and the precontrol valve of the outlet valve are arranged in the housing cover in the longitudinal direction, with orientation of their actuation axes parallel to the division plane, largely centrally over the diaphragms of the inlet valve and the outlet valve, and that the housing cover consists of a centrally arranged magnet module containing the magnetic coils of the precontrol valves and of two air guide modules arranged each at the end adjacent to the magnet module in the longitudinal direction, each comprising valve bores and control channels of the precontrol valves, and each provided with a control chamber upper part of the adjacent inlet valve or outlet valve, and connected via a single connecting element both to each other and to the base housing.

The invention is therefore based on a valve unit known in itself for modulating pressure in a compressed air braking system, which has a brake pressure input, a brake pressure output, a purge output, an inlet valve configured as a diaphragm valve, an outlet valve configured as a diaphragm valve, and for each diaphragm valve a precontrol valve which is configured as a 3/2-way solenoid valve. The compressed air inputs and compressed air outputs, the diaphragm and solenoid valves, are arranged in an elongate valve housing which is divided by a division plane that is largely horizontal in the installation position into a base housing and a housing cover. The brake pressure input and the brake pressure output are arranged with horizontal orientation, largely axially opposite in the longitudinal direction of the valve housing, and the purge output is arranged for example in-between, oriented vertically downward in the base housing. The diaphragm valves are arranged in the base housing between the brake pressure input and the brake pressure output, with parallel actuation axes and diaphragms arranged in a common diaphragm plane, largely corresponding to the division plane, being clamped between the base housing and the housing cover, behind each other in the longitudinal direction. The precontrol valves however are arranged in the housing cover.

According to the invention, the precontrol valve of the inlet valve and the precontrol valve of the outlet valve are arranged in the housing cover in the longitudinal direction, with orientation of their actuation axes parallel to the division plane, largely centrally over the diaphragms of the inlet valve and the outlet valve. The housing cover consists of a centrally arranged magnet module containing the magnetic coils of the precontrol valves and of two air guide modules arranged each at the end adjacent to the magnet module in the longitudinal direction, each comprising valve bores and control channels of the precontrol valves, and each provided with a control chamber upper part of the adjacent inlet valve or outlet valve. According to the invention, the magnet module and the two air guide modules are joined by a single connecting element, via which the housing cover formed therefrom is also connected to the base housing.

The control chamber upper parts each have a chamber inner wall delimiting the control chamber of the respective diaphragm valve, and a chamber edge clamping the diaphragm of the respective diaphragm valve.

In installed state, the mechanical components of both solenoid valves and the respective valve core, the respective valve rotor and the respective valve spring, are each inserted largely centrally in the assigned magnetic coil of the magnet module and on the end in the assigned valve bores of the air guide module.

Because the precontrol valves are arranged lying when the valve unit is in the installation position, i.e. in the longitudinal direction parallel to the division plane of the valve housing, the installation height of the valve cover is particularly low and hence the dimensions of the entire valve unit particularly compact. This is particularly advantageous since, to achieve a short reaction time of the wheel brakes concerned when the anti-lock functions are actuated, such valve units are arranged as close as possible to the assigned wheel brake cylinders and the installation space available there is normally small. Due to the modular construction and the connection of the modules via the connecting element both to each other and to the base housing, the housing cover is easy to install and connect to the base housing. Also, the modules of the housing cover can be produced relatively simply, for example as injection moldings, decored without problems and because of the good accessibility, easily machined for example to produce the valve bores and control channels on the air guide modules and the edges on the control chamber upper parts.

To achieve a particularly compact construction of the housing cover, the connecting element is configured as a flat fixing plate which, parallel to the division plane of the valve housing, engages in corresponding recesses of the air guide module each arranged between the valve bores and the associated control chamber upper part, and which with unilaterally open transverse slots surrounds respectively at least one transverse web of the air guide module running at right angles to the division plane and to the longitudinal direction of the valve housing, and which comprises bores for bolting the housing cover to the base housing.

To avoid further bores in the fixing plate and sealing elements for sealing them against the air guide modules, according to a refinement of the invention, the control channels of the precontrol valves are arranged in the transverse webs of the air guide module.

The precontrol valves may be configured as separate solenoid valves which, advantageously with opposite switching direction and each with valve seat facing the diaphragm of the assigned inlet or outlet valve, are each arranged axially parallel and radially adjacent to each other in the magnet module and the air guide modules. Due to this orientation of the solenoid valves, for both precontrol valves the pilot volumes to be filled or emptied on switching are particularly small. Advantageously, this leads to particularly short switching reaction times of the diaphragm valves when the solenoid valves are switched.

The two valve seats mentioned may be connected integrally to the assigned air guide module, or formed thereon.

To simplify installation and to improve the function of the precontrol valves, the mechanical components of the solenoid valves are preferably combined in a respective valve cartridge, which may also include valve seats structurally separate from the respective air guide modules.

As an alternative to the use of individual solenoid valves, the precontrol valves may also be combined in a double-rotor solenoid valve with a common magnetic coil, in which the individual solenoid valves, with opposite switching direction and each with valve seat facing the diaphragm of the assigned inlet valve or outlet valve, are arranged coaxially and axially adjacent to each other in the insert part.

The magnetic coil of the double-rotor solenoid valve can be powered with a low and a high current, wherein the precontrol valves are configured such that the solenoid valve assigned to the inlet valve is switched by powering the magnetic coil with the low current, whereas the solenoid valve assigned to the outlet valve is only switched by powering the magnetic coil with the high current.

Alternatively, the magnetic coil of the double-rotor solenoid valve may have a central take-off for partial powering, wherein the precontrol valves are configured such that the solenoid valve assigned to the inlet valve is switched by a partial powering of the magnetic coil, whereas the solenoid valve assigned to the outlet valve is only switched by a full powering of the magnetic coil.

The above-mentioned switching characteristics of the double-rotor solenoid valve are achieved largely in that, for the precontrol valve assigned to the inlet valve, a valve spring with correspondingly low spring stiffness is used, and for the precontrol valve assigned to the outlet valve, a valve spring with correspondingly high spring stiffness is used.

In this embodiment of the precontrol valves, again the mechanical components of the double-rotor solenoid valve are combined preferably in a valve cartridge for easier installation and improved function, wherein the mechanical components of at least one solenoid valve, to allow installation, have an outer diameter which does not increase in the direction of its valve seat.

In both embodiments of the solenoid valves, the magnet module and one of the air guide modules may be formed integrally for easier installation, wherein the mechanical components of at least the solenoid valve whose valve seat is arranged in the valve bore of the respective air guide module, to allow installation, has an outer diameter which does not increase in the direction of the valve seat.

Such a construction can be achieved in that the respective solenoid valve has an internal valve spring which is arranged between the respective valve rotor and the assigned valve core.

The connecting cables of the magnetic coils are preferably routed within the magnet module and advantageously terminate in contacts of a connection bush formed on the magnet module. When plastic is spray-molded around the magnetic coils in the usual fashion, the connecting cables of the magnetic coils are thus firstly optimally protected from damage. Secondly, it is thus possible to arrange the connecting bush of the magnetic coils flexibly according to the requirements of the respective vehicle manufacturer, i.e. if required with different bush shape and different orientation, at various places on the magnet module.

If however the connecting bush is intended to be arranged on one of the air guide modules, this can be achieved in that connecting cables of the magnetic coils are routed within the magnetic module, which are connected via plug connections to connecting cables which are arranged in one of the air guide modules and terminate in contacts of a connecting bush formed on the respective air guide module.

To avoid plug connections, alternatively this can also be achieved in that the connecting cables of the magnetic coils are routed within the magnet module and terminate in contacts which protrude at the end from the magnet module and extend through openings into a connecting bush formed on the respective air guide module.

BRIEF DESCRIPTION OF THE DRAWINGS

For further clarification of the invention, drawings of several exemplary embodiments are attached to the description. In the drawings.

DETAILED DESCRIPTION OF THE DRAWINGS

Figure 1:
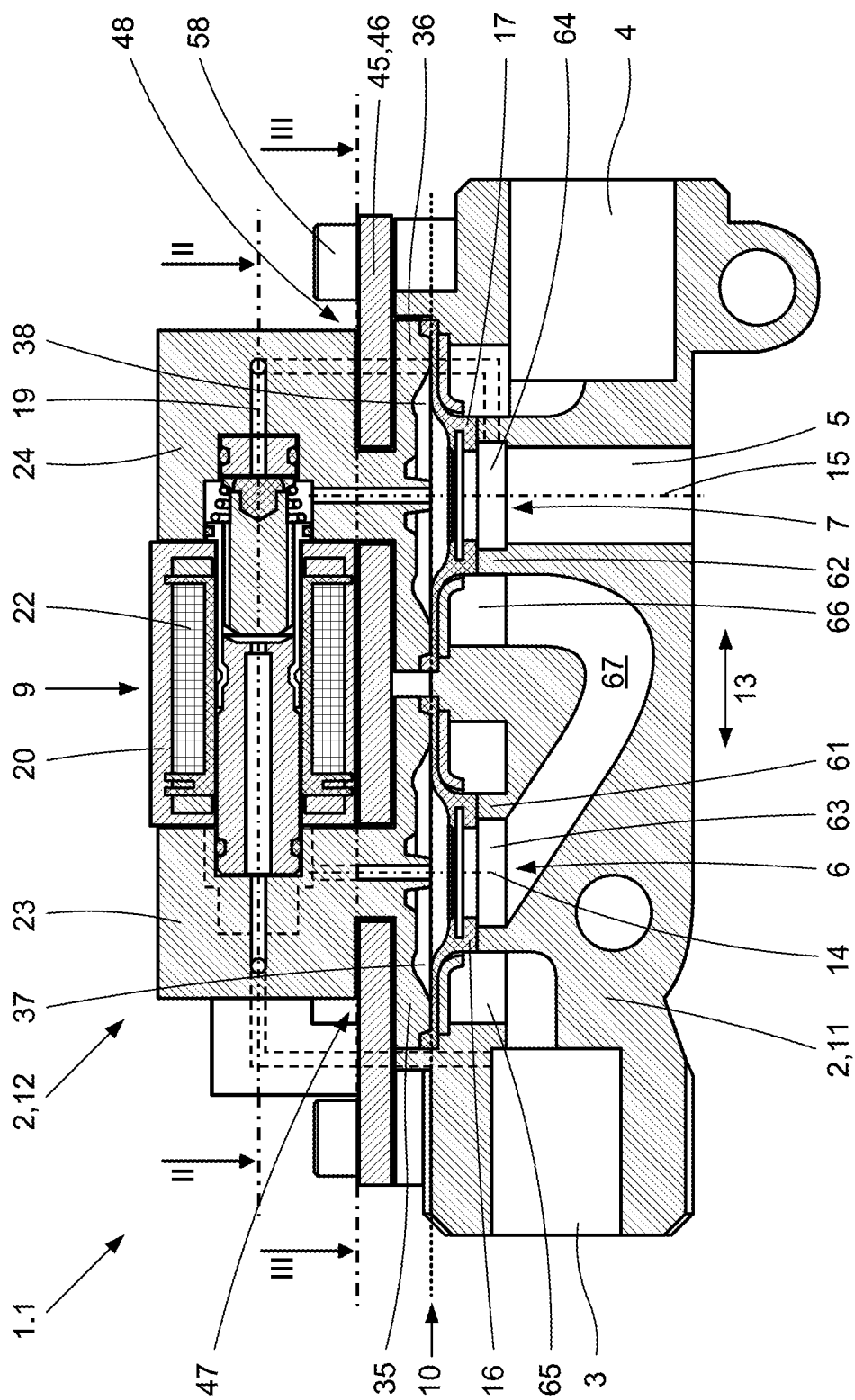
FIG. 1 shows a first embodiment of a valve unit according to the invention in a vertical longitudinal section.
Figure 2:
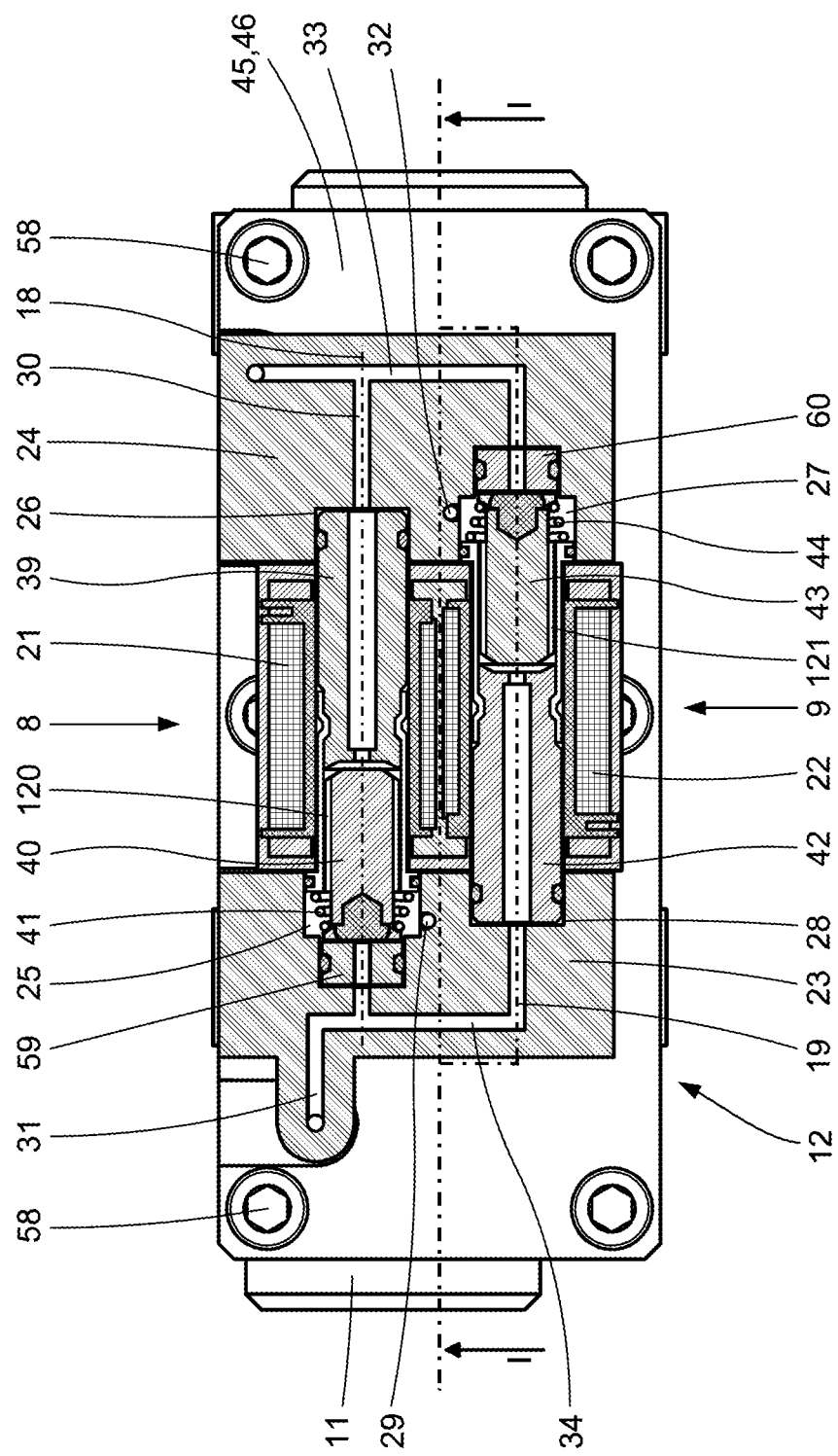
FIG. 2 shows the first embodiment of the valve unit according to FIG. 1 in a first horizontal section.
Figure 3:
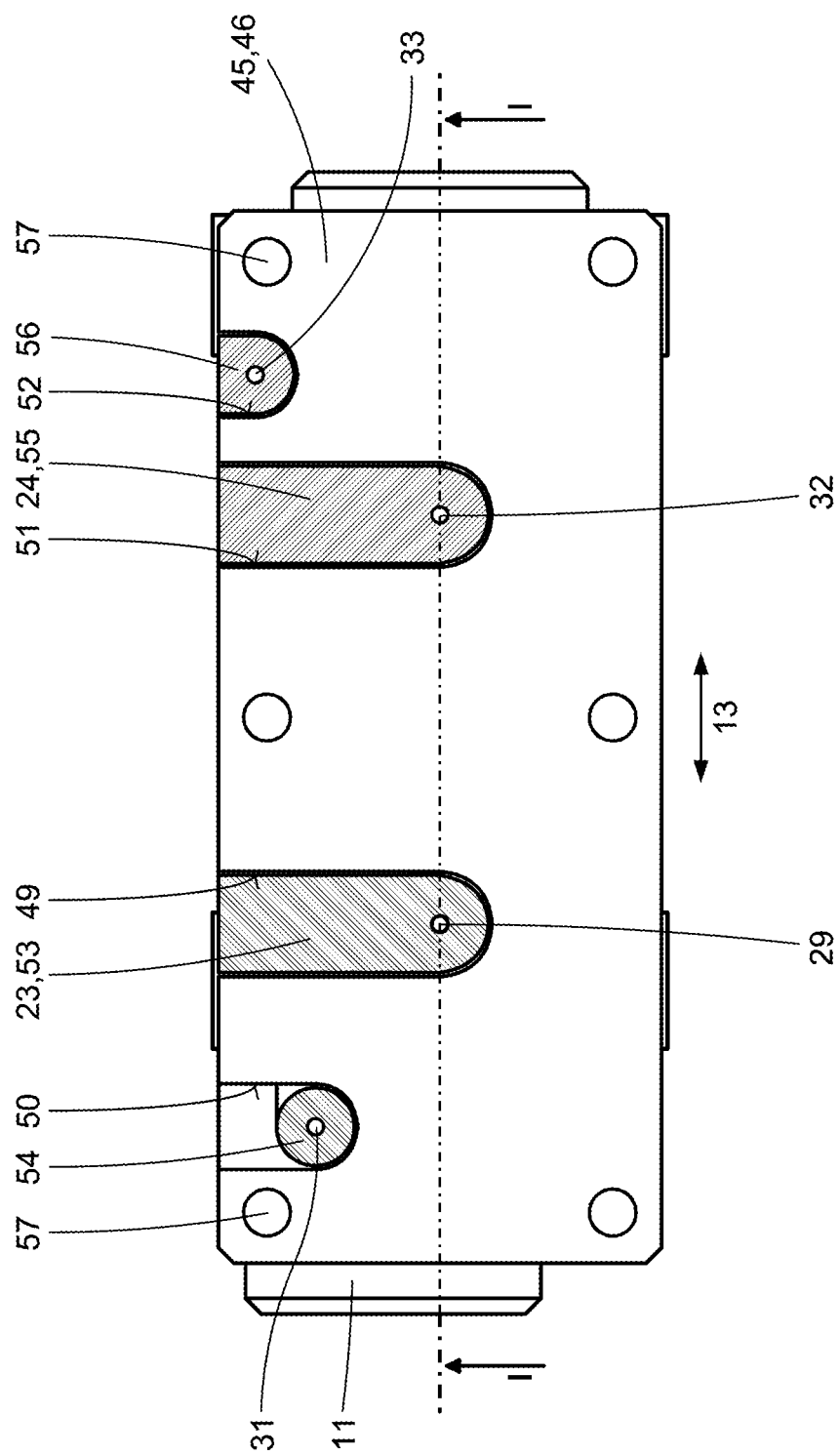
FIG. 3 shows the first embodiment of the valve unit according to FIGS. 1 and 2 in a second horizontal section.

A first embodiment of a valve unit according to the invention 1.1 is shown in FIG. 1 in a vertical longitudinal section I-I according to FIGS. 2 and 3, in FIG. 2 in a first horizontal section II-II according to FIG. 1, and in FIG. 3 in a second horizontal section III-III according to FIG. 1.

A brake pressure input 3, a brake pressure output 4, a purge output 5, an inlet valve 6 configured as a diaphragm valve, an outlet valve 7 configured as a diaphragm valve, and for each diaphragm valve 6, 7 a precontrol valve 8, 9 configured as a 3/2-way solenoid valve, are arranged in an elongate valve housing 2. The valve housing 2 is divided by a division plane 10, that is largely horizontal in the installation position, into a base housing 11 and a housing cover 12. The brake pressure input 3 and the brake pressure output 4 are arranged in this exemplary embodiment with horizontal orientation, largely axially opposite in the longitudinal direction 13 of the valve housing 2, and the purge output 5 is arranged in-between, oriented vertically downward, in the base housing 11. The two diaphragm valves 6, 7 are arranged in the base housing 11 between the brake pressure input 3 and the brake pressure output 4, with parallel actuation axes 14, 15 and diaphragms 16, 17 arranged in a common diaphragm plane, largely corresponding to the division plane 10, being clamped between the base housing 11 and the housing cover 12, behind each other in the longitudinal direction 13. The two precontrol valves 8, 9 however are arranged in the housing cover 12.

According to the invention, the precontrol valve 8 of the inlet valve 6 and the precontrol valve 9 of the outlet valve 7 are arranged in the housing cover 12 in the longitudinal direction 13, with orientation of their actuation axes 18, 19 parallel to the division plane 10, largely centrally over the diaphragms 16, 17 of the inlet valve 6 and the outlet valve 7. As illustrated in particular in FIG. 2, the housing cover 12 consists of a centrally arranged magnet module 20 containing the magnetic coil 21, 22 of the precontrol valves 8, 9, and of two air guide modules 23, 24 each arranged at the end adjacent to the magnet module 20 in the longitudinal direction 13. The air guide modules 23, 24 each have valve bores 25, 26; 27, 28 and control channels 29, 30, 31; 32, 33, 34 of the precontrol valves 8, 9 and are each provided with a control chamber upper part 35, 36 of the adjacent inlet or outlet valve 6, 7. The two control chamber upper parts 35, 36 each engage in an opening of the base housing 11 containing the diaphragm 16, 17 of the respective diaphragm valve 6, 7. The two control chamber upper parts 35, 36 with their edges clamp the respective diaphragm 16, 17, and with their outer wall facing the base housing 11 delimit the respective control chamber 37, 38 of the respective diaphragm valve 6, 7.

Figure 4:
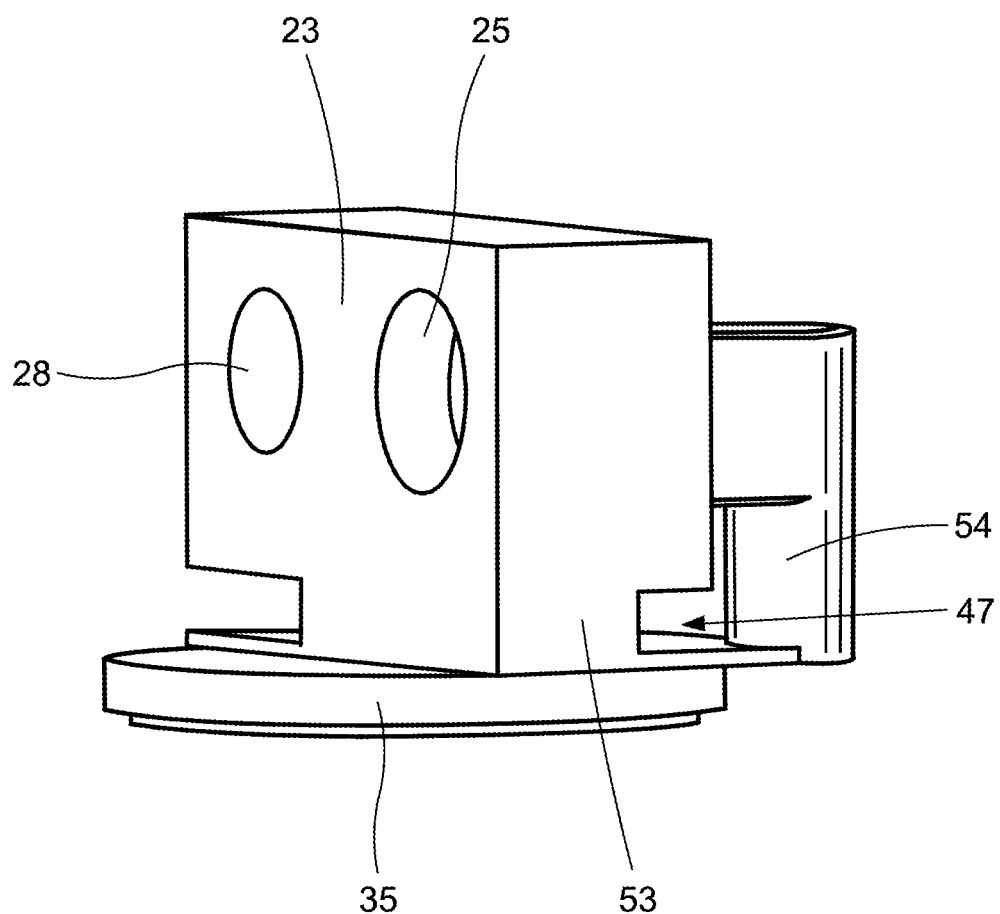
FIG. 4 shows an air guide module of the first embodiment of the valve unit according to FIGS. 1 to 3 in a perspective view.

The mechanical components such as the respective valve core 39, 41, the respective valve rotor 40, 43, the respective valve seat 59, 60 and the respective valve spring 41, 44, are inserted in the magnetic coils 21, 22 of the magnet module 20 and in the valve bores 25, 26; 27, 28 of the air guide modules 23, 24. The two valve seats 59, 60 may also be integrally connected to the respective air guide module 23, 24. The magnet module 20 and the air guide modules 23, 24 are connected via a single connecting element 45 both to each other and to the base housing 11. To illustrate the geometry of the air guide modules 23, 24, the input-side air guide module 23 arranged above the inlet valve 6 is shown in a perspective view in FIG. 4.

As shown in particular in FIG. 3, the connecting element 45 is preferably configured as a flat fixing plate 46 which, parallel to and spaced from the division plane 10 of the valve housing 2, engages in corresponding recesses 47, 48 of the air guide modules 23, 24 arranged between the valve bores 25, 26; 27, 28 and the respective control chamber upper part 35, 36. The fixing plate 46 with unilaterally open transverse slots 49, 50; 51, 52, surrounds transverse webs 53, 54; 55, 56 of the air guide modules 23, 24, each formed at right angles to the division plane 10 and running at right angles to the longitudinal direction 13 of the valve casing 2.

Also, the fixing plate 46 is provided in the present case, as an example, with six bores 57, via which the fixing plate 46 and hence the entire housing cover 12 is bolted to the base housing 11 via six screws 58. To avoid further bores in the fixing plate 46 and sealing elements for sealing these, the control channels 29, 31; 32, 34 of the precontrol valves 8, 9 are arranged inside the transverse webs 53, 54; 55, 56 of the air guide modules 23, 24.

In the present case, the two precontrol valves 8, 9 are configured as separate solenoid valves which, each with opposing switching direction and with valve seat 59, 60 facing the diaphragm 16, 17 of the assigned inlet or outlet valve 6, 7, are each arranged axially parallel and radially adjacent to each other in the magnet module 20 and the air guide modules 23, 24.

The diaphragm 16 of the inlet valve 6, and the diaphragm 17 of the outlet valve 7, because of their shaping, each lie on a valve seat 61, 62 of a cylindrical central channel 63, 64, which can be connected to or shut off from a cylindrical ring channel 65, 66 arranged coaxially thereto by loading the control chamber 37, 38 arranged between the respective diaphragm 16, 17 and the assigned control chamber upper part 35, 36, with a low or high control pressure. The cylindrical ring channel 65 of the inlet valve 6 is connected to the brake pressure input 3.

The central channel 63 of the inlet valve 6 is connected via a connecting channel 67 to the cylindrical ring channel 66 of the outlet valve 7, which is in turn connected to the brake pressure output 4. The cylindrical ring channel 64 of the outlet valve 7 is connected to the purge output 5. Hence the brake pressure output 4 can be alternately connected to or shut off from the brake pressure input 3 via the inlet valve 6. Hence the brake pressure output 4 can be alternately connected to or shut off from the brake pressure input 5 via the inlet valve 7.

The valve unit 1.1 has the switch functions "build up pressure", "maintain pressure", and "reduce pressure". In the "build up pressure" switch function of the valve unit 1.1, the inlet valve 6 is opened and the outlet valve 7 is closed, so that the brake pressure introduced via the brake valve at the brake pressure input 3 is conducted unchanged to the brake pressure output 4 and to at least one wheel brake cylinder connected thereto. Since the "build up pressure" switch function corresponds to the rest state of the valve unit 1.1, the precontrol valve 8 of the inlet valve 6, when its magnetic coil 21 is unpowered, connects the control chamber 37 of the inlet valve 6 via the control channel 29, valve bore 26, longitudinal grooves 120 in the valve rotor 40, and a central bore in the valve core 39, to a control channel 30 carrying a low control pressure which is connected to the purge output 5 via a further control channel 33. The diaphragm 16, shown lying on the valve seat 61 of the inlet valve 6 in FIG. 1 because of it shaping, is in this case moved by a brake pressure present in the ring channel 65 in the direction of the control chamber 37, whereby the inlet valve 6 is opened.

Similarly, the precontrol valve 9 of the outlet valve 7, when its magnetic coil 22 is unpowered, connects the control chamber 38 of the outlet valve 7 via the control channel 32, valve bore 28, longitudinal grooves 121 in the valve rotor 43, and a central bore in the valve core 42, to a control channel 34 carrying a high control pressure which is connected to the brake pressure input 3 via a further control channel 31.

In the "maintain pressure" switch function of the valve unit 1.1, the inlet valve 6 and the outlet valve 7 are closed so that the brake pressure, present at the brake pressure output 4 and at the at least one wheel brake cylinder connected thereto, is held constant. To set this "maintain pressure" switch function, only the precontrol valve 8 of the inlet valve 6 is switched by powering its magnetic coil 21, whereby the respective valve rotor 40 is drawn axially inward from the valve seat 59 against the return force of the valve spring 41. As a result, the control chamber 37 of the inlet valve 6 is connected via the control channel 29 and valve bore 25 to the control channel 31 carrying the high control pressure, which is connected to the brake pressure input 3.

In the "reduce pressure" switch function of the valve unit 1.1, the inlet valve 6 is closed and the outlet valve 7 opened so that the brake pressure output 4 and at the at least one wheel brake cylinder connected thereto are purged via the purge output 5. To set this switch function, both precontrol valves 8, 9 are switched by powering of their magnetic coils 21, 22. By powering the magnetic coils 22 of the precontrol valve 9 assigned to the outlet valve 7, the respective valve rotor 43 is drawn axially inward away from the valve seat 60, against the return force of the valve spring 44, whereby the control chamber 38 of the outlet valve 7 is connected via the control channel 32 and valve bore 27 to the control channel 31 carrying the low control pressure, which is connected to the purge output 5.

The "maintain pressure" and "reduce pressure" switch functions of the valve unit 1.1 are antilock functions with which a braking-induced locking of the at least one assigned wheel is avoided. The switch functions are controlled by a corresponding actuation of the precontrol valves 8, 9 by a control unit of the anti-lock system, in which the signals from the wheel speed sensors are analyzed to detect an impending or existing locking of the braked wheels.

Because the precontrol valves 8, 9 are arranged lying when the valve unit 1.1 is in the installation position, i.e. in the longitudinal direction 13 parallel to the division plane 10 of the valve housing 2, the installation height of the valve cover 12 is particularly low and hence the dimensions of the entire valve unit 1.1 particularly compact. This is particularly advantageous since, to achieve a short reaction time of the wheel brakes concerned when the anti-lock functions are actuated, such valve units 1.1 are arranged as close as possible to the assigned wheel brake cylinders and the installation space available there is normally small.

Due to the orientation of the two solenoid valves 8, 9 with valve seats 59, 60 arranged adjacent to the two diaphragms 16, 17 or the two control chambers 37, 38 of the assigned diaphragm valves 6, 7, for both precontrol valves 8, 9 the pilot volumes to be filled or emptied on switching are particularly small. Advantageously, this leads to particularly short switching reaction times of the diaphragm valves 6, 7 when the solenoid valves 8, 9 are switched.

Due to the modular construction and connection of the magnet module 20 and the two air guide modules 23, 24 via the fixing plate 46 both to each other and to the base housing 11, the housing cover 12 is easy to install and connect to the base housing 11. Also, said modules 20, 23, 24 of the housing cover 12 can be produced relatively simply, for example as injection moldings, decored without problems and because of the good accessibility, easily machined for example to produce the valve bores 25-28 and control channels 29-34 on the air guide modules 23, 24 and the edges on the control chamber upper parts 35, 36.

Figure 5A:
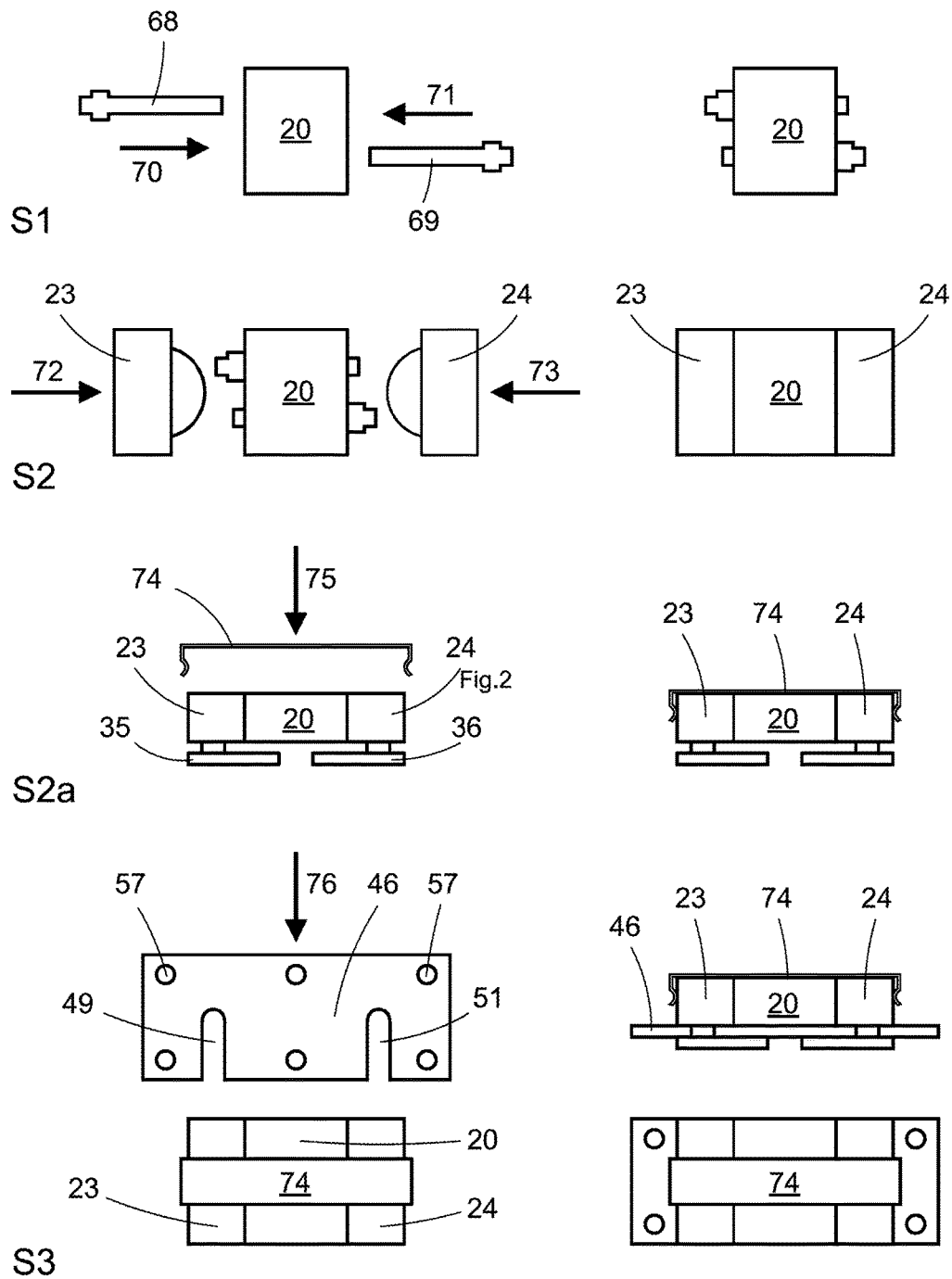
FIG. 5a shows a first part of method steps for mounting the first embodiment of the valve unit according to FIGS. 1 to 4 in diagrammatic depictions.
Figure 5B:
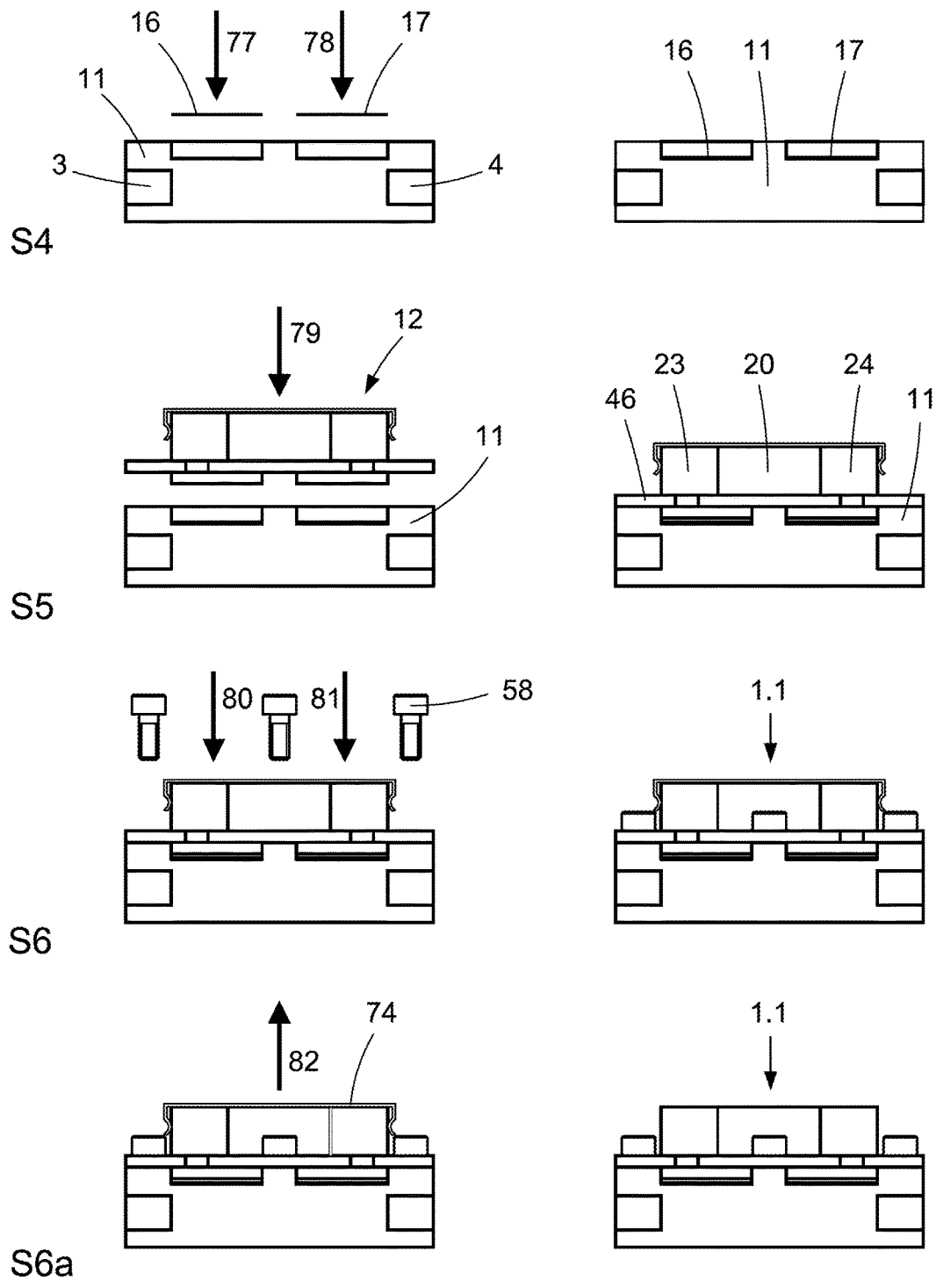
FIG. 5b shows a second part of method steps for mounting the first embodiment of the valve unit according to FIGS. 1 to 4 in diagrammatic depictions.

FIGS. 5a and 5b now show diagrammatically the assembly of such a valve unit, as an example using the first embodiment of the valve unit 1.1 according to FIGS. 1 to 4. In FIGS. 5a and 5b, the process of the respective mounting step is shown on the left, and the result of the respective mounting step on the right.

In mounting step S1, first the mechanical components 39, 40, 41, 59; 42, 43, 44, 60 of the precontrol valves 8, 9, preferably combined in a respective valve cartridge 68, 69, are inserted in the magnet module 20 containing the magnetic coils 21, 22 according to mounting arrows 70, 71.

In mounting step S2, the two air guide modules 23, 24 are pushed at the end onto the magnet module 20 according to the mounting arrows 72, 73, with the valve cartridges 68, 69 engaging in the valve bores 25, 26; 27, 28.

In the optional intermediate step S2a, the magnet module 20 and the air guide modules 23, 24 are fixed together for easier assembly by applying a mounting bracket 74, surrounding one of the air guide modules 23, 24 at the end, as shown by mounting arrow 75. It is clear that a control chamber upper part 35, 36 is formed on both air guide modules 23, 24, away from the mounting bracket.

In mounting step S3, the fixing plate 46 is inserted laterally in the recesses 47, 48 of the air guide modules 23, 24, as shown by mounting arrow 76, wherein the transverse webs 53, 55 of the air guide modules 23, 24 are surrounded on both sides by the unilaterally open transverse slots 49, 51 of the fixing plate 46. This fixes the magnet module 20 and the air guide modules 23, 24 together by form fit in the longitudinal direction 13.

In mounting step S4, first the two diaphragms 16, 17 of the inlet valve 6 or outlet valve 7 are inserted in the corresponding openings of the base housing 11 according to the mounting arrows 77, 78, before—in mounting step S5—the housing cover 12 consisting of the magnet module 20 and air guide modules 23, 24 is placed on the base housing 11, as shown by mounting arrows 79, with engagement of the control chamber upper part 35, 36 in the assigned openings of the diaphragm valves 6, 7.

Then in mounting step S6, the fixing plate 46 is bolted to the base housing 11 by several screws 58 guided through bores 57, according to mounting arrows 80, 81, whereby said modules 20, 23, 24 of the housing cover 12 are connected together and to the base housing 11 by form- and force-fit.

In the optional extra step S6a, finally the mounting bracket 74 is removed again from the housing cover 12 according to mounting arrow 82, and withdrawn from the valve unit 1.1.

It is clear from the description that, because of the modular structure of the housing cover 12, assembly of the valve unit 1.1 is comparatively simple and quick.

Figure 6:
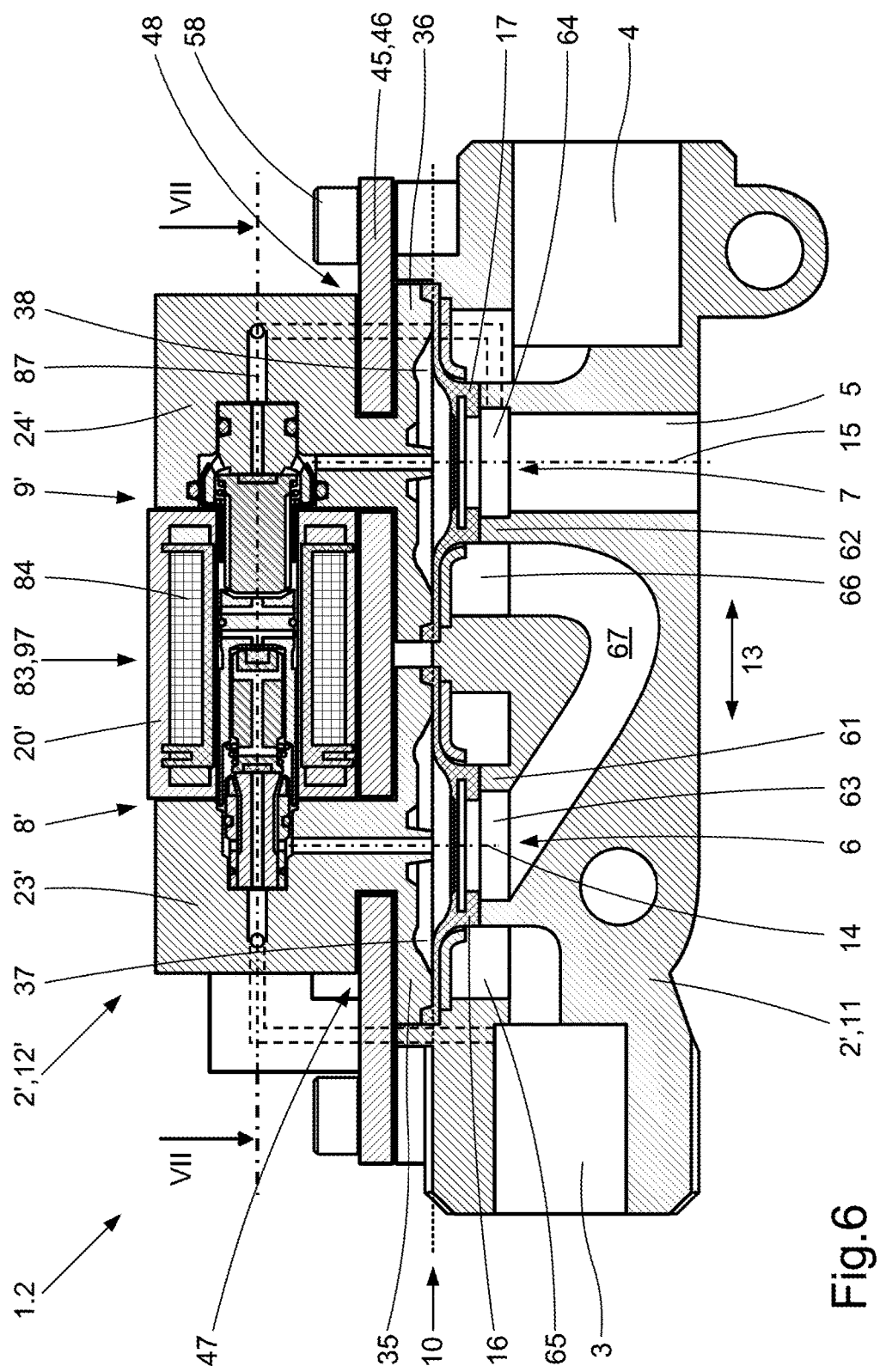
FIG. 6 shows a second embodiment of the valve unit in a vertical longitudinal section.
Figure 7:
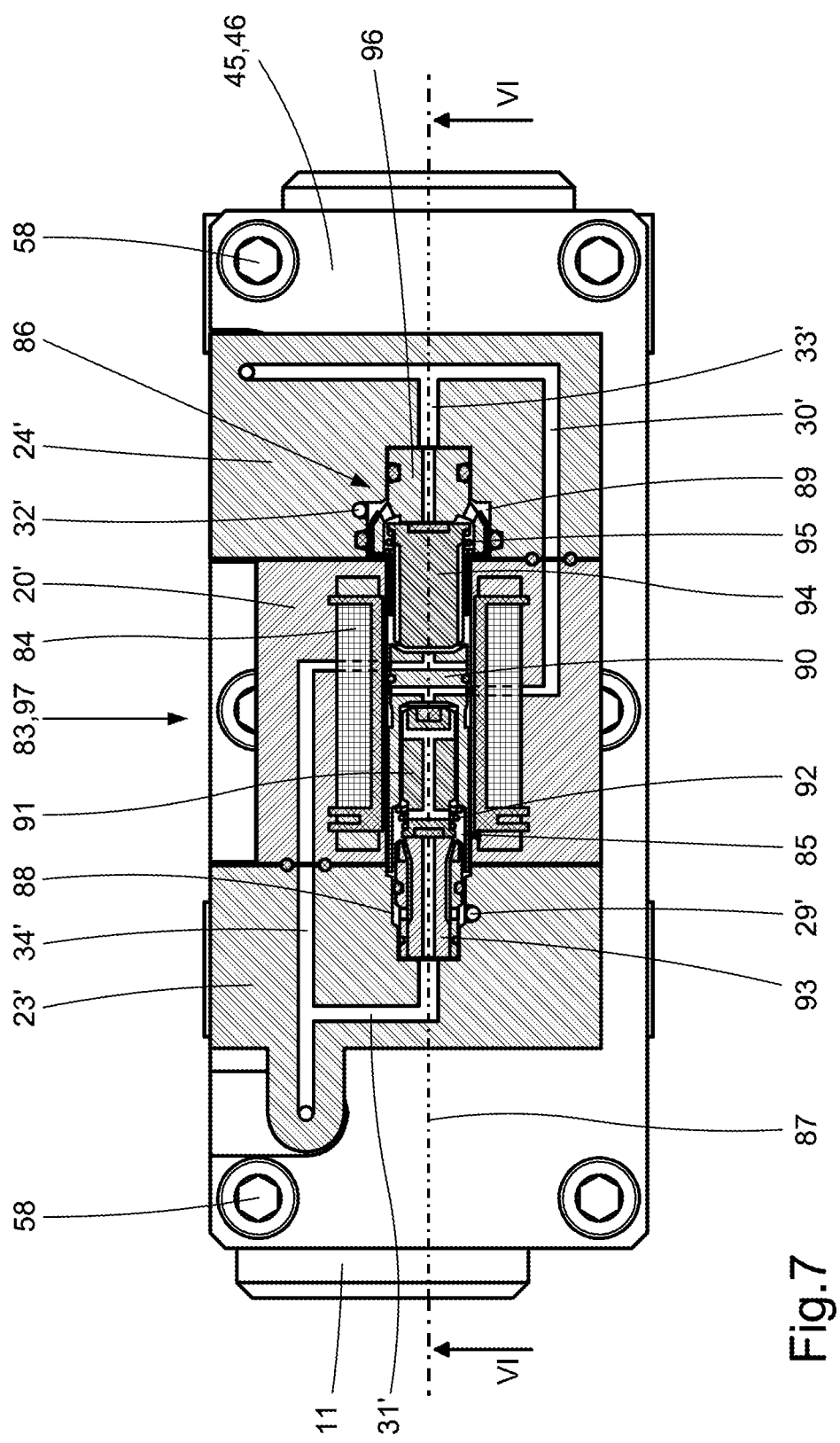
FIG. 7 shows the second embodiment of the valve unit according to FIG. 6 in a horizontal section.

A second embodiment of the valve unit 1.2 configured according to the invention, shown in FIG. 6 in a longitudinal center section VI-VI according to FIG. 7, and in FIG. 7 in a horizontal section VII-VII according to FIG. 6, differs from the valve unit 1.1 in FIGS. 1 to 4, with the same function, in that the precontrol valves 8', 9' are now structurally combined in a double-rotor solenoid valve 83 with a common magnetic coil 84. Inside the double-rotor solenoid valve 83, the individual solenoid valves 8', 9' with opposite switching direction and each with valve seat 85, 86 facing the diaphragm 16, 17 of the assigned inlet or outlet valve 6, 7, are arranged coaxially to and axially adjacent to each other in the magnet module 20' and the air guide modules 23', 24'.

In the "build up pressure" switch function of the valve unit 1.2 in which the inlet valve 6 is open and the outlet valve 7 is closed, the precontrol valve 8' of the inlet valve 6, when the magnetic coil 84 is not powered, connects the control chamber 37 of the inlet valve 6 via a control channel 29', valve bore 88, longitudinal grooves arranged in an outer valve core 93, radial and central bores arranged in the assigned valve rotor 91, and radial and central bores arranged in a central valve core 90, to a control channel 30' carrying a low control pressure which is connected to the purge output 5. Similarly, the precontrol valve 9' of the outlet valve 7, when the magnetic coil 84 is not powered, connects the control chamber 38 of the outlet valve 7 via a control channel 32', valve bore 89, diagonal bores arranged in an outer valve core 96, longitudinal grooves arranged in the assigned valve rotor 94, and radial and central bores arranged in the central valve core 90, to a control channel 34' carrying a high control pressure which is connected to the brake pressure input 3.

In the "maintain pressure" switch function of the valve unit 1.2, in which the inlet valve 6 and outlet valve 7 are closed, only the precontrol valve 8' of the inlet valve 6 is switched by powering the magnetic coil 84 with a low current or, where a central take-off is provided on the magnetic coil 84, by partially powering the magnetic coil 84. The valve rotor 91 of the precontrol valve 8' is drawn axially inward away from the valve seat 85 against the return force of the respective valve spring 92. In this way, the control chamber 37 of the inlet valve 6 is connected via the control channel 29', the valve bore 88, the longitudinal grooves arranged in the outer valve core 93, and a central bore, to a control channel 31' carrying the high control pressure which is connected to the brake pressure input 3 via the control channel 34' of the precontrol valve 9'.

In the "reduce pressure" switch function of the valve unit 1.2, in which the inlet valve 6 is closed and the outlet valve 7 is open, both precontrol valves 8', 9' are switched by powering the magnetic coil 84 with a high current or, where a central take-off is provided on the magnetic coil 84, by fully powering the magnetic coil 84. On switching of the precontrol valve 9' assigned to the outlet valve 7, the assigned valve rotor 94 is drawn axially inward away from the valve seat 86 against the return force of the respective valve spring 95. In this way, the control chamber 38 of the inlet valve 7 is connected via the control channel 32', the valve bore 89, the diagonal grooves arranged in the outer valve core 96, and a central bore, to a control channel 33' carrying the low control pressure which is connected to the purge output 5 via the control channel 30' of the precontrol valve 8'.

The stepped actuation of the precontrol valves 8', 9' is achieved by a correspondingly low spring stiffness of the valve spring 92 of the precontrol valve 8' assigned to the inlet valve 6, and a correspondingly high spring stiffness of the valve spring 95 of the precontrol valve 9' assigned to the outlet valve 7. For easier installation and improved function of the precontrol valves 8', 9', the mechanical components of the double-rotor solenoid valve 83, such as the central valve core 90, the valve rotors 91, 94, the valve springs 92, 95, the valve seats and the outer valve cores 93, 96, in the present case, as an example, are combined in a valve cartridge 97 which is inserted in the magnetic coil 84 of the magnet module 20' and at the end in the respective valve bore 88, 89 of the air guide modules 23', 24'.

Figure 8:
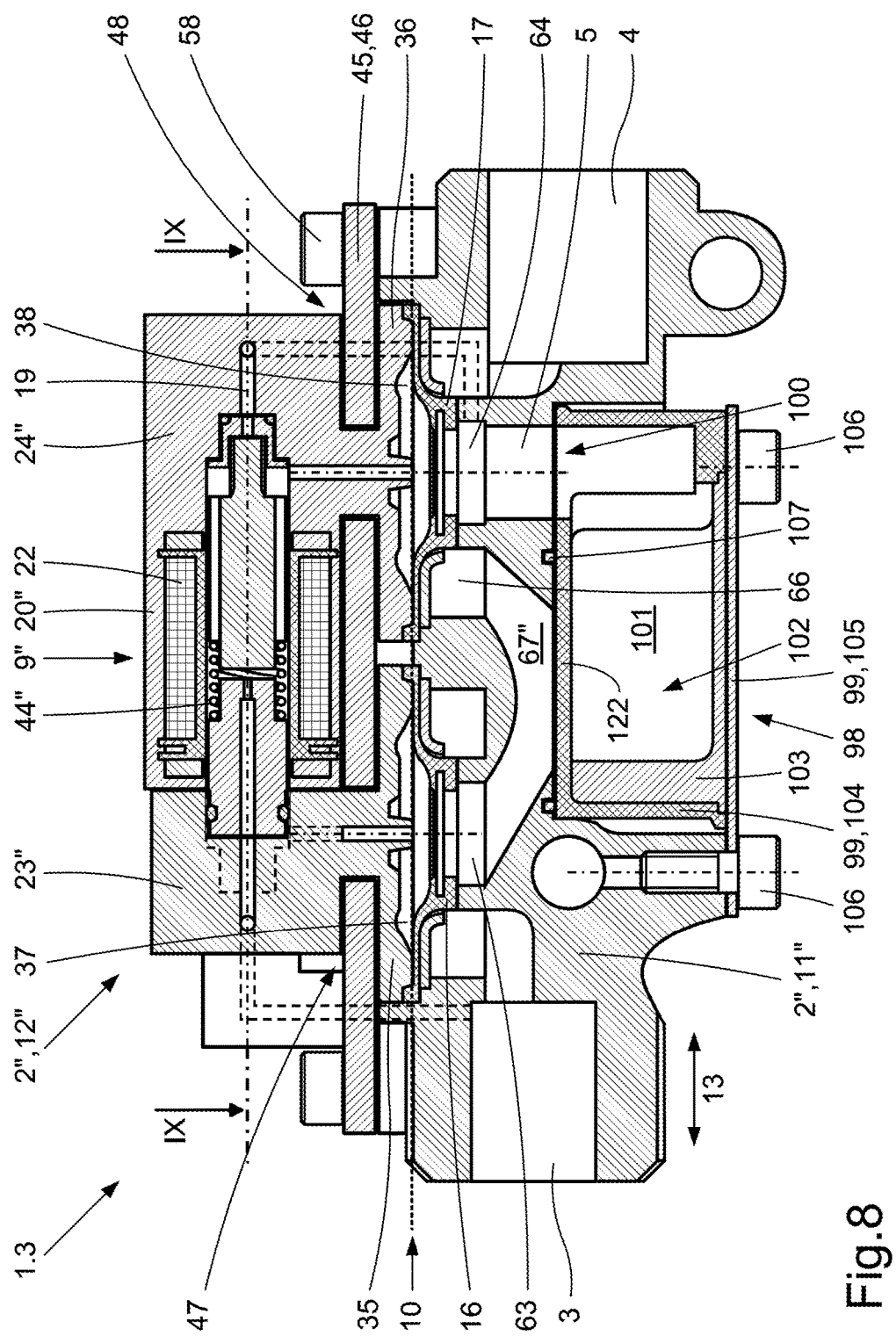
FIG. 8 shows a third embodiment of the valve unit in a vertical longitudinal section.
Figure 9:
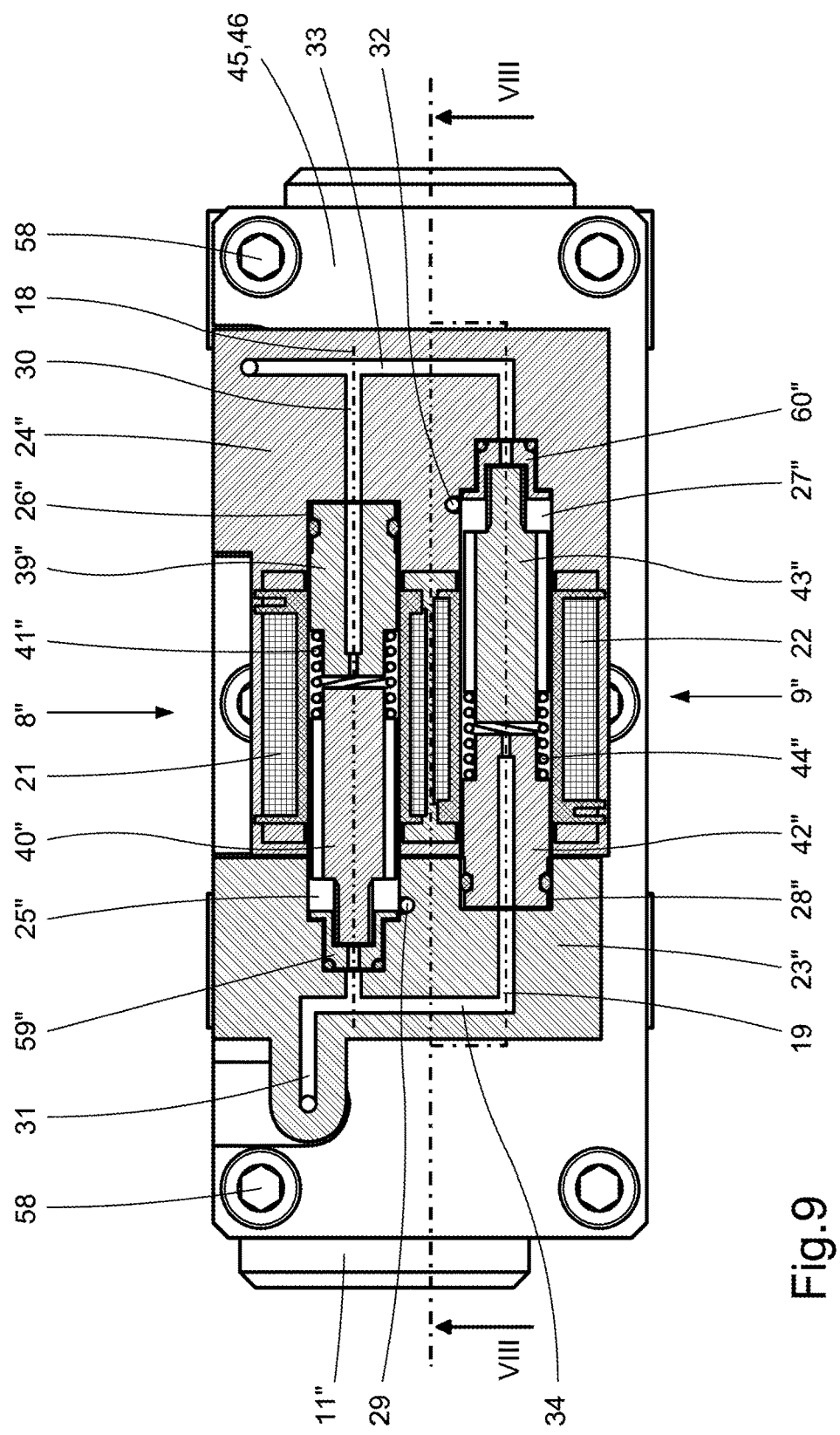
FIG. 9 shows the third embodiment of the valve unit according to FIG. 8 in a horizontal section.

A third embodiment of a valve unit 1.3 according to the invention, shown in FIG. 8 in a vertical longitudinal section VIII-VIII according to FIG. 9 and in FIG. 9 in a horizontal section IX-IX according to FIG. 8, differs from the valve unit 1.1 according to FIGS. 1 to 4, with the same function, in that the magnet module 20" and the output-side air guide module 24" are now formed integrally, i.e. structurally combined in a common component. In order to allow assembly of the mechanical components 39"-41"; 42"-44", in particular of the precontrol valve 9" assigned to the outlet valve 7, the two solenoid valves 8", 9" have an outer diameter which does not increase in the direction of their valve seats 59", 60". In the present case, this is achieved in that both solenoid valves 8", 9" have an internal valve spring 41", 44" which is arranged between the respective valve rotor 40", 43" and the assigned valve core 39", 42".

Furthermore, the valve unit 1.3 according to FIGS. 8 and 9 is provided as an example with a silencer 98 arranged at the purge output 5. The silencer 98 has a largely cylindrical silencer housing 99 with an inlet opening 100, an internal calming chamber 101, and an outlet opening 102 not shown in FIG. 8. The outlet opening 102 which extends in the cylinder wall of the silencer housing 99 over an angular range of around 270° with orientation towards the brake pressure input 3, is positioned inside the silencer housing 99 downstream of a silencer insert 103 comprising an air-permeable and sound-damping material assembly. The silencer housing 99 consists of a pot-like cylindrical bottom housing 104 and a flat housing lid 105, and is inserted in a recess of the base housing 11" between the brake pressure input 3 and the brake pressure output 4. The silencer 98 is attached to the valve housing 2" via a bolted connection of the housing lid 105 to the base housing 11" comprising several screws 106.

The housing floor 122 of the bottom housing 104 facing the division plane 10 of the valve housing 2", in the present case closes a connecting channel 67" which is open to the outside and via which the central channel 63 of the inlet valve 6 is connected to the ring channel 66 of the outlet valve 7. To seal the connecting channel 67", sealing elements 107 are arranged between adjacent housing walls of the base housing 11" and the housing floor 122 of the bottom housing 104.

Figure 10:
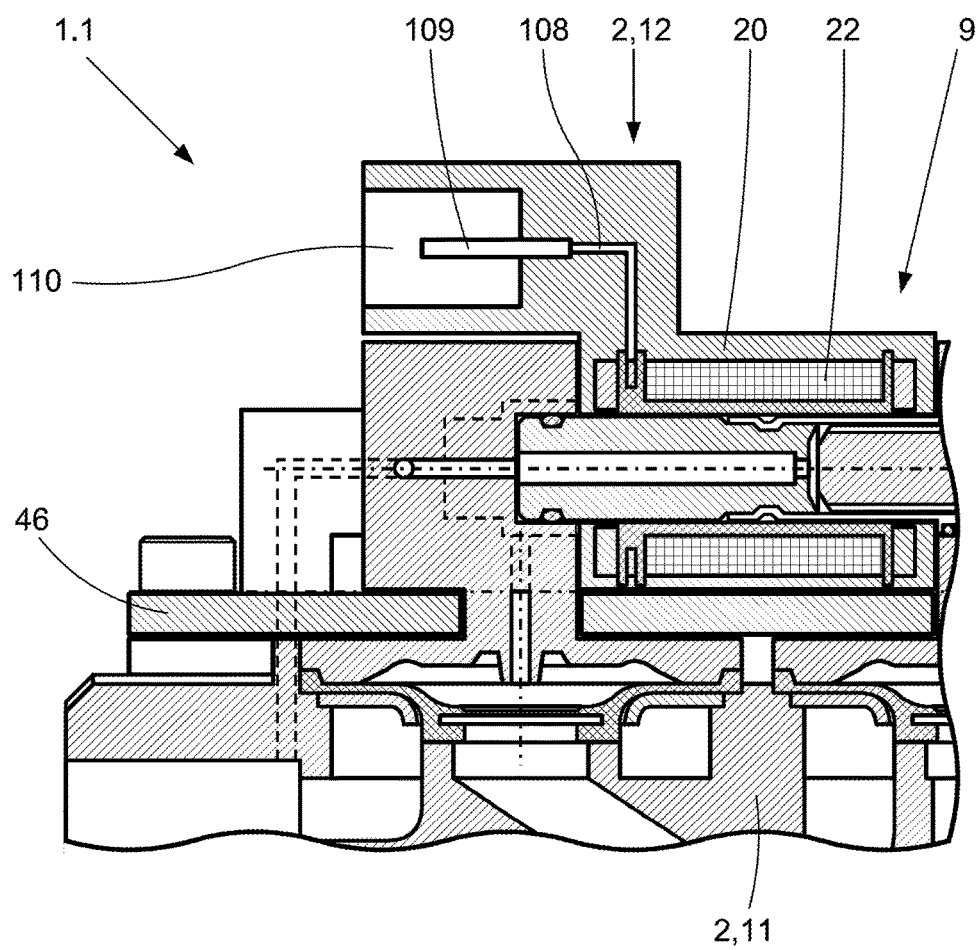
FIG. 10 shows a first embodiment of a connecting bush for magnetic coils in a partial longitudinal section.

In a partial longitudinal section of a valve unit 1.1 according to FIG. 10, which was taken for example from the section view of FIG. 1, a first embodiment of a connecting bush 110 is shown for connecting the magnetic coils 21, 22 of the solenoid valves 8, 9 to a voltage source. In this embodiment, the connecting bush 110 is formed integrally on the magnet module 20. The connecting cables 108 of the magnetic coils 21, 22 are routed completely inside the magnets module 20 and terminate in contacts 109 of the connecting bush 110.

Figure 11:
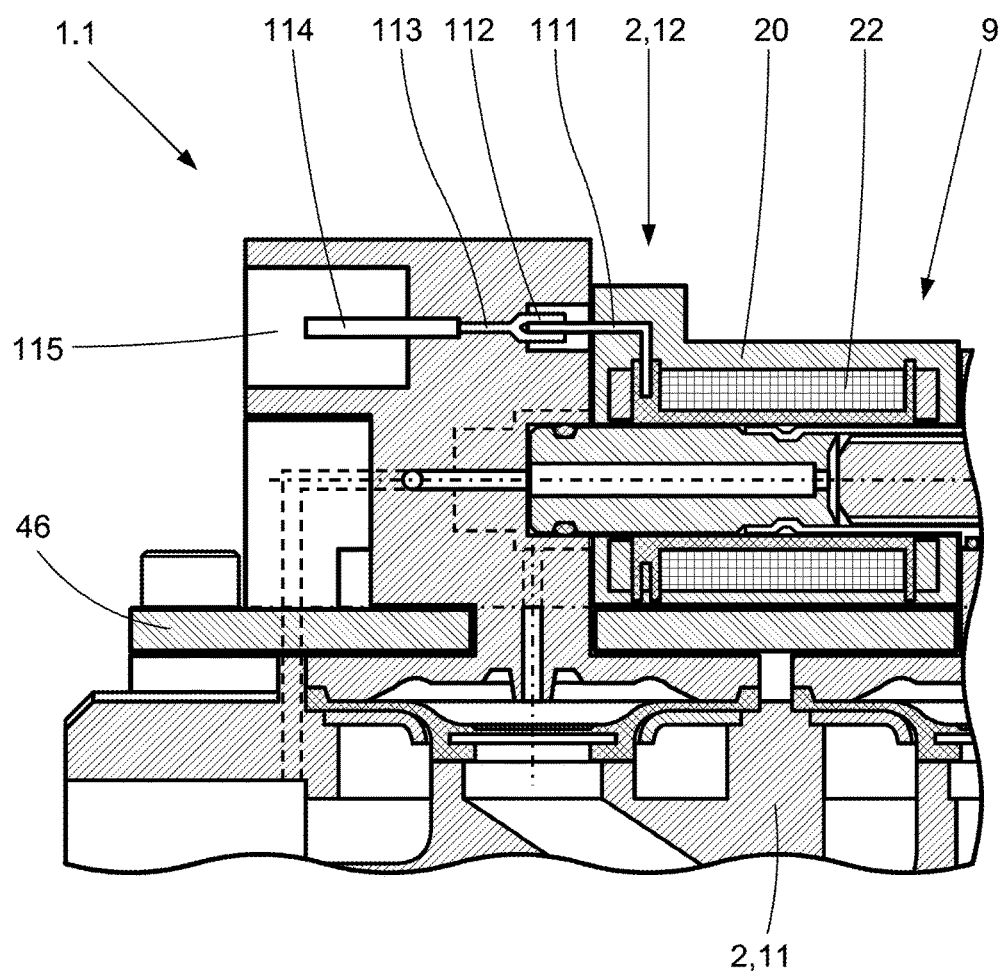
FIG. 11 shows a second embodiment of a connecting bush for magnetic coils in a partial longitudinal section.

In a second embodiment of a connecting bush 115 of the magnetic coils 21, 22 according to FIG. 11, again connecting cables 111 of the magnetic coils 21, 22 are routed within the magnet module 20. These are however guided on the input side out of the magnet module 20, and are connected via plug connectors 112 to connecting cables 113 which are arranged in the input-side air guide module 23 and terminate in contacts 114 of the connecting bush 115 formed on this air guide module 23.

Figure 12:
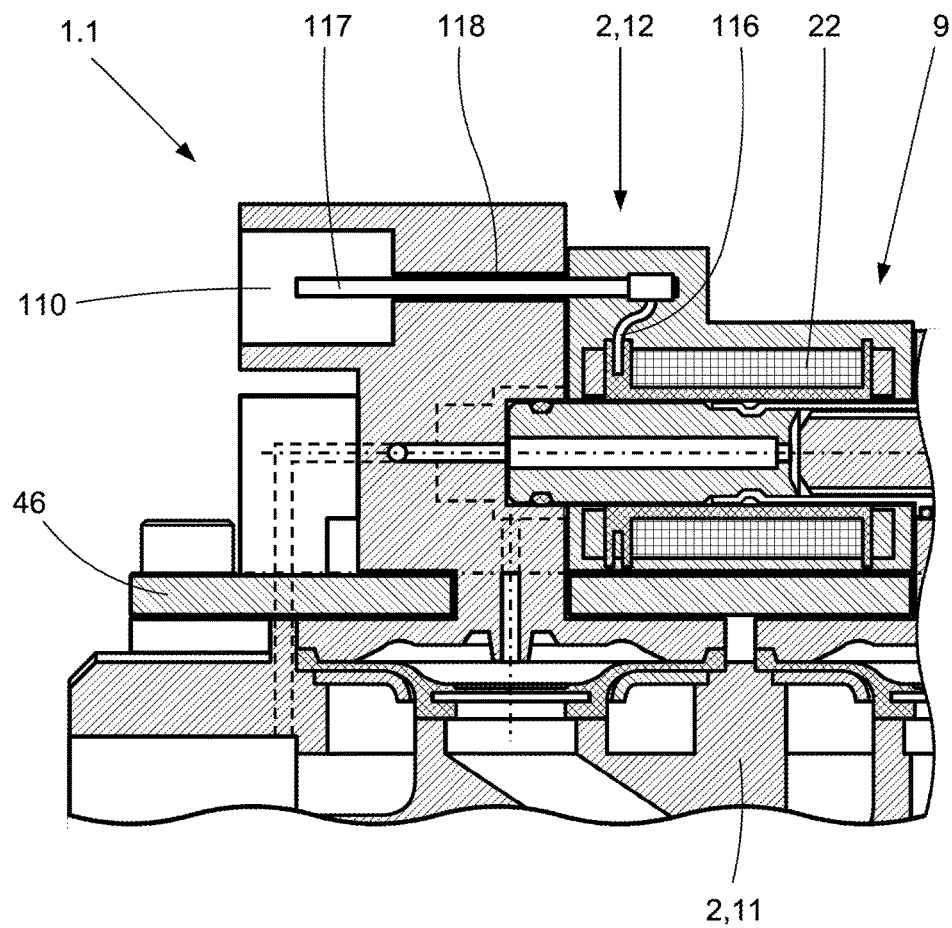
FIG. 12 shows an embodiment of a connecting bush for magnetic coils in a partial longitudinal section.

In a third embodiment of a connecting bush 119 of the magnetic coils 21, 22 according to FIG. 12, connecting cables 116 of the magnetic coils 21, 22 are routed within the magnet module 20 and terminate in contacts 117, which protrude at the end face from the magnet module 20 and which extend through openings 118 into a connecting bush 119 formed on the input-side air guide module 23.

While the above description constitutes the preferred embodiments of the present invention, it will be appreciated that the invention is susceptible to modification, variation and change without departing from the proper scope and fair meaning of the accompanying claims.

The invention claimed is:

1. A valve unit (1.1, 1.2, 1.3) for modulating pressure in a compressed air braking system, the valve unit comprising
   a brake pressure input (3),
   a brake pressure output (4), and
   a purge output (5),
   an inlet valve (6) configured as a diaphragm valve,
   an outlet valve (7) configured as a diaphragm valve,
   for each of the diaphragm valves (6, 7), a respective precontrol valve (8, 9), each of which is configured as a 3/2-way solenoid valve,
   an elongate valve housing (2), which is divided by a division plane (10), which extend in a horizontal direction in an installation position, into a base housing (11) and a housing cover (12), wherein the brake pressure input (3) and the brake pressure output (4) and the purge output (5) are arranged in the base housing (11), the diaphragm valves (6, 7) are arranged behind each other in a longitudinal direction (13) in the base housing (11) between the brake pressure input (3) and the brake pressure output (4), with parallel actuation axes (14, 15) and with diaphragms (16, 17) arranged in a common diaphragm plane parallel to and proximate to the division plane (10), and clamped between the base housing (11) and the housing cover (12), and the precontrol valves (8, 9) are arranged in the housing cover (12),
   wherein the precontrol valve (8) of the inlet valve (6) and the precontrol valve (9) of the outlet valve (7) are arranged in the housing cover (12) with actuation axes in the longitudinal direction (13), with an orientation of their actuation axes (18, 19) parallel to the division plane (10), above the diaphragms (16, 17) of the inlet valve (6) and the outlet valve (7), and
   wherein the housing cover (12) consists of a centrally arranged magnet module (20) containing magnetic coils (21, 22) of the precontrol valves (8, 9) and of two air guide modules (23, 24) arranged each at an end adjacent to the magnet module (20) in the longitudinal direction (13), each of the air guide modules comprising valve bores (25, 26, 27, 28) and control channels (29, 30, 31, 32, 33, 34) of the precontrol valves (8, 9), and each of the air guide modules having a control chamber upper part (35, 36) of the inlet valve (6) or the outlet valve (7), and being connected via a single connecting element (45) both to the other one of the two air guide modules and to the base housing (11).

2. The valve unit as claimed in claim 1, wherein the connecting element (45) is a flat fixing plate (46)
   which, parallel to the division plane (10) of the valve housing (2), engages in corresponding recesses (47, 48) of at least one of the air guide modules (23, 24) each arranged between the valve bores (25, 26, 27, 28) and an associated control chamber upper part (35, 36), and
   which, with unilaterally open transverse slots (49, 50, 51, 52), surrounds respectively at least one transverse web (53, 54, 55, 56) of the at least one of the air guide modules (23, 24) running at right angles to the division plane (10) and to the longitudinal direction (13) of the valve housing (2), and which comprises bores (57) for bolting the housing cover (12) to the base housing (11).

3. The valve unit as claimed in claim 2, wherein the control channels (29, 30, 31, 32, 33, 34) of the precontrol valves (8, 9) are arranged in transverse webs (53, 54, 55, 56) of the air guide module (23, 24).

4. The valve unit as claimed in claim 1, wherein the precontrol valves (8, 9) are configured as separate solenoid valves with opposite switching directions, each of the precontrol valves having a valve seat (59, 60) facing a respective one of the diaphragms (16, 17) of the inlet valve and the outlet valve (6, 7), the precontrol valves (8, 9) being arranged axially parallel and radially adjacent to each other in the magnet module (20) and in the air guide modules (23, 24).

5. The valve unit as claimed in claim 4, wherein each of the two valve seats (59, 60) is integrally connected to a respective assigned one of the air guide modules (23, 24).

6. The valve unit as claimed in claim 4, wherein mechanical components (39, 40, 41, 42, 43, 44, 59, 59', 60, 60') of the solenoid valves (8, 9) are combined in a respective valve cartridge (68, 69).

7. The valve unit as claimed in claim 1, wherein the precontrol valves (8', 9') are combined in a double-rotor solenoid valve (83) with a common magnetic coil (84), in which the precontrol valves (8', 9') have opposite switching directions, each of the precontrol valves having a valve seat (85, 86) facing a respective one of the diaphragms (16, 17) of the inlet valve (6) and the outlet valve (7), the precontrol valves (8, 9) being arranged coaxially and axially adjacent to each other in the magnet module (20') and in the air guide modules (23', 24').

8. The valve unit as claimed in claim 7, wherein the magnetic coil (84) of the double-rotor solenoid valve (83) is configured to be powered with a low current and a high current, and wherein the precontrol valves (8', 9') are configured such that the precontrol valve (8') assigned to the inlet valve (6) is switched by powering the magnetic coil (84) with the low current, whereas the solenoid valve (9') assigned to the outlet valve (7) is only switched by powering the magnetic coil (84) with the high current.

9. The valve unit as claimed in claim 7, wherein the magnetic coil (84) of the double-rotor solenoid valve (83) has a central take-off for partial powering, and wherein the precontrol valves (8', 9') are configured such that the solenoid valve (8') assigned to the inlet valve (6) is switched by a partial powering of the magnetic coil (84), whereas the solenoid valve (9') assigned to the outlet valve (7) is only switched by a full powering of the magnetic coil (84).

10. The valve unit as claimed in claim 7, wherein mechanical components (90, 91, 92, 93, 94, 95, 96) of the double-rotor solenoid valve (83) are combined in a valve cartridge (97), wherein the mechanical components (90, 91, 92, 93, 94, 95, 96) of at least one of the precontrol valves (8', 9') have an outer diameter which does not increase in the direction toward the valve seat (85, 86).

11. The valve unit as claimed in claim 1, wherein the magnet module (20") and one of the air guide modules (24") are configured integrally, wherein at least one of the precontrol valves (9") has a valve seat (60") arranged in one of the valve bores (27") of a respective one of the air guide modules (24") and includes mechanical components (42", 43", 44") having an outer diameter that does not increase toward the valve seat (60").

12. The valve unit as claimed in claim 11, wherein the at least one of the precontrol valves (9") has an internal valve spring (44") which is arranged between a respective valve rotor (43") and an assigned valve core (42").

13. The valve unit as claimed in claim 1, wherein connecting cables (108) of the magnetic coils (21, 22) are routed within the magnet module (20) and terminate in contacts (109) of a connecting bush (110) formed on the magnet module (20).

14. The valve unit as claimed in claim 1, wherein connecting cables (111) of the magnetic coils (21, 22) are routed within the magnet module (20) and are connected via plug connections (112) to connecting cables (113) which are arranged in at least one of the air guide modules (23) and which terminate in contacts (114) of a connecting bush (115) formed on the magnet module (20).

15. The valve unit as claimed in claim 1, wherein connecting cables (116) of the magnetic coils (21, 22) are routed within the magnet module (20) and terminate in contacts (117) which protrude at an end face from the magnet module (20) and which extend through openings (118) into a connecting bush (119) formed on at least one of the air guide modules (23).

* * * * *